US008245144B2

(12) United States Patent
Van Ness et al.

(10) Patent No.: US 8,245,144 B2
(45) Date of Patent: Aug. 14, 2012

(54) OBJECT MODEL FOR A USER INTERFACE

(75) Inventors: Shawn A. Van Ness, Newcastle, WA (US); Paul J. Kwiatkowski, Bellevue, WA (US); Nikhil Dang, Redmond, WA (US); Martyn S. Lovell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 12/163,367

(22) Filed: Jun. 27, 2008

(65) Prior Publication Data

US 2009/0327922 A1    Dec. 31, 2009

(51) Int. Cl.
*G06F 17/00* (2006.01)
*G06F 3/00* (2006.01)

(52) U.S. Cl. ........ 715/760; 715/234; 715/255; 715/746; 719/328; 719/332

(58) Field of Classification Search .......... 715/200–205, 715/207, 226, 229, 254, 255, 700, 749, 760, 715/762, 763, 231, 234, 240, 243, 251, 253, 715/256, 273, 275, 731, 744, 746, 747, 764, 715/765; 719/310, 328, 332, FOR. 170
See application file for complete search history.

(56) References Cited

U.S. PATENT DOCUMENTS

| | | | |
|---|---|---|---|
| 6,230,159 B1 | 5/2001 | Golde | |
| 6,598,093 B1 * | 7/2003 | Schmidt et al. | ............... 719/328 |
| 6,880,129 B1 | 4/2005 | Lee | |
| 6,941,521 B2 | 9/2005 | Lin et al. | |
| 6,968,503 B1 | 11/2005 | Chang et al. | |
| 6,973,625 B1 | 12/2005 | Lupo | |
| 6,990,654 B2 | 1/2006 | Carroll | |
| 7,278,109 B2 | 10/2007 | Shalabi | |
| 7,331,014 B2 * | 2/2008 | Relyea et al. | .................. 715/713 |
| 7,743,387 B2 * | 6/2010 | Smith et al. | .................... 719/316 |
| 2003/0177282 A1 * | 9/2003 | Hejlsberg et al. | .............. 709/328 |
| 2004/0002952 A1 * | 1/2004 | Lee et al. | ............................ 707/1 |
| 2004/0230900 A1 * | 11/2004 | Relyea et al. | .................. 715/513 |
| 2006/0085745 A1 * | 4/2006 | Anderson et al. | ............. 715/530 |
| 2006/0129921 A1 * | 6/2006 | Relyea et al. | .................. 715/524 |
| 2008/0059504 A1 | 3/2008 | Barbetta | |
| 2008/0077872 A1 | 3/2008 | Zeevi | |

OTHER PUBLICATIONS

"XAML Overview", Retrieved from http://msdn2.microsoft.com/en-us/library/ms752059.aspx on Apr. 8, 2008., 14 Pages.
"XPCOM Interfaces", Retrieved from http://www.xulplanet.com/tutorials/xultu/xpcom.html on Apr. 8, 2008., 4 Pages.
"XML-Based User Interface Language", Retrieved from http://www.xul.fr/en-xml-xul.html on Apr. 8, 2008., 5 Pages.

* cited by examiner

*Primary Examiner* — Maikhanh Nguyen
(74) *Attorney, Agent, or Firm* — Wolfe-SBMC

(57) ABSTRACT

Various embodiments provide techniques and processes for defining elements of a user interface (UI) using a tree of objects created based on a markup language. In some embodiments, a client application provides markup that defines one or more aspects of a UI to an application programming interface (API). The API parses the markup to determine a namespace and one or more UI elements defined by the namespace. Instances of the UI elements are created, and properties of the UI elements are set on the instances. A user interface may then be displayed that includes the instances of the UI elements.

20 Claims, 4 Drawing Sheets

OBJECT MODEL FOR A USER INTERFACE

BACKGROUND

Object-oriented programming (OOP) provides techniques for creating binary software components (objects) that can interact with each other. One example of OOP is the Component Object Model (COM). COM specifies an object model and programming requirements that enable this object interaction. A COM object can be created using one of a variety of different programming languages (e.g., C++, Visual Basic, and so on). The flexibility and simplicity of COM have enabled it to become a widely adopted and long-lived standard. However, certain aspects of COM present challenges when creating a graphical user interface (GUI).

First, COM typically lacks the ability to support a new object class which extends from a base class. As a result, a first party is unable to create a COM object that derives from and extends a COM object that is created by another party. Second, it is difficult to interface COM objects with declarative markup languages (e.g., XAML) to specify layouts, appearances, behaviors of a particular part or parts of a GUI. These particular challenges can make it difficult for COM to be used to implement a GUI.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques and processes for defining elements of a user interface (UI) using a tree of objects created based on a markup language. In some embodiments, a client application provides markup that defines one or more aspects of a UI to an application programming interface (API). The API parses the markup to determine a namespace and one or more UI elements defined by the namespace. Instances of the UI elements are created, and properties of the UI elements are set on the instances. A user interface may then be displayed that includes the instances of the UI elements.

BRIEF DESCRIPTION OF THE DRAWINGS

The same numbers are used throughout the drawings to reference like features.

DETAILED DESCRIPTION

Overview

Figure 1:
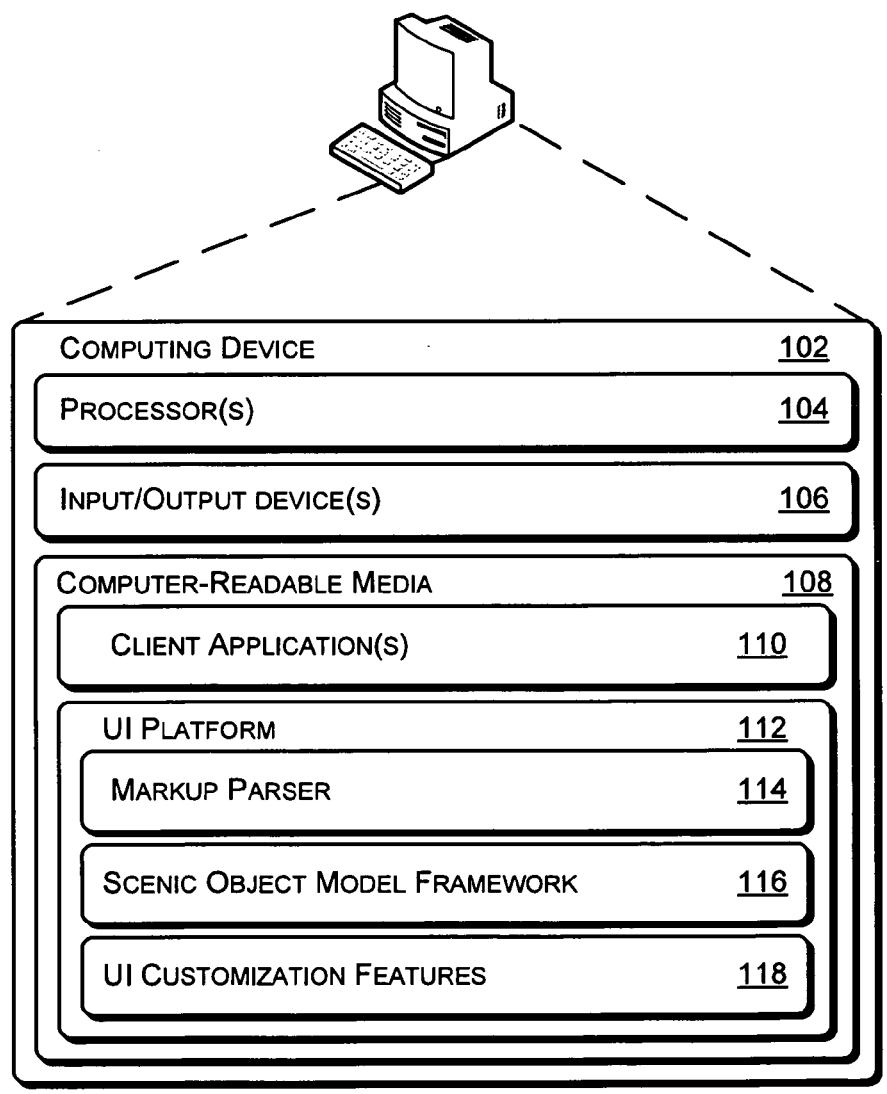
FIG. 1 illustrates one example of an operating environment in which various principles and techniques described herein for generating user interface elements can be employed in accordance with one or more embodiments.

Various embodiments provide a user interface (UI) platform that implements aspects of a markup language (e.g., XML, XAML, and so on) and object-oriented programming methods to provide flexible and customizable ways of defining and/or generating a graphical UI. While the UI platform is discussed with reference to component object model (COM) methodology and terminology, this is not intended to be limiting, and any suitable object-oriented programming methodology may be utilized without departing from the spirit and scope of the claimed embodiments.

The UI platform includes a User Interface Object Model (UIOM) that enables developers to create new object class types that inherit and/or override functionality from base classes. UIOM also enables objects and/or object properties to be referenced by name (e.g., within a namespace), such that objects and/or properties can be coded in a markup language to specify the layout, appearance, and/or behavior of one or more aspects of a UI. In some embodiments, UIOM includes an application programming interface (API) that manages the loading, registration, instantiation, and/or initialization of UIOM classes. A UIOM class may also inherit properties and/or behavior from a base class defined by UIOM.

In an implementation example, the UI platform receives markup from a client application that defines one or more aspects of a UI. The UI platform then parses the markup looking for a namespace and a class name of a UI object within the namespace. In some embodiments, a namespace comprises multiple class type objects, with each class type object representing one or more UI elements such as a button, a textbox, a banner, and so on. In this example, if the platform encounters the markup "acme:textbox", the platform recognizes that the markup designates the namespace "acme" and the "textbox" class name within the "acme" namespace. The UI platform then creates a tree of one or more COM objects that correspond to the namespace "acme" and class name "textbox", and sets properties (e.g., visual attributes such as size, color, and so on) on the object(s) within the tree. The tree includes a "textbox" node with particular properties, and the "textbox" node is used to display a textbox in a UI. As discussed above, the "textbox" node may inherit properties and or functionally from a UIOM base class.

In the discussion that follows, a section entitled "Operating Environment" is provided and describes an environment in which one or more embodiments can be employed. Following this, a section entitled "Example Architecture" is provided and describes one example of an object-oriented architecture that can implement various principles and techniques discussed herein. Next, a section entitled "Example Processes" discusses a few examples of processes that may implement various techniques discussed herein for defining and/or generating various aspects of a user interface. Following this, a section entitled "Implementation Specifics" discusses a variety of implementation details for implementing the UIOM architecture in one or more embodiments. Finally, some example object interfaces are provided that implement a variety of UI creation methods that utilize the UIOM architecture.

Operating Environment

FIG. 1 illustrates generally at 100 one example of an operating environment that is operable to employ one or more aspects of the UI platform, in accordance with one or more embodiments. Environment 100 includes a computing device 102 having one or more processors 104, one or more input/output devices 106, and one or more computer-readable media 108. The computing device 102 can be embodied as any suitable computing device such as, by way of example and not limitation, a desktop computer, a portable computer, or a handheld computer such as a personal digital assistant (PDA), cell phone, and the like. The computing device 102 is configured such that it can interface with one or more networks (not shown), such as a local area network, a wide area network, the Internet, the World Wide Web, and so on.

Stored on computer-readable media 108 are one or more client applications 110 and a UI platform 112. Examples of client applications include a web browser, a media rendering application, an instant messaging client, a web development application, and so on. As part of UI platform 112 are markup parser 114, a User Interface Object Model (UIOM) framework 116 and UI customization features 118. Markup parser 114 processes markup code and converts the markup into a form that can be utilized by the UI platform. The UIOM framework is an object model that provides, among other things, the ability for class types to extend and/or override functionality in base classes, as well as functionality for creating and initializing instances of classes based on markup namespace identifiers. The UI customization features enable developers and other parties to create custom UI objects and/or properties that can be used by the UIOM framework to create a UI.

Example Architecture

Figure 2:
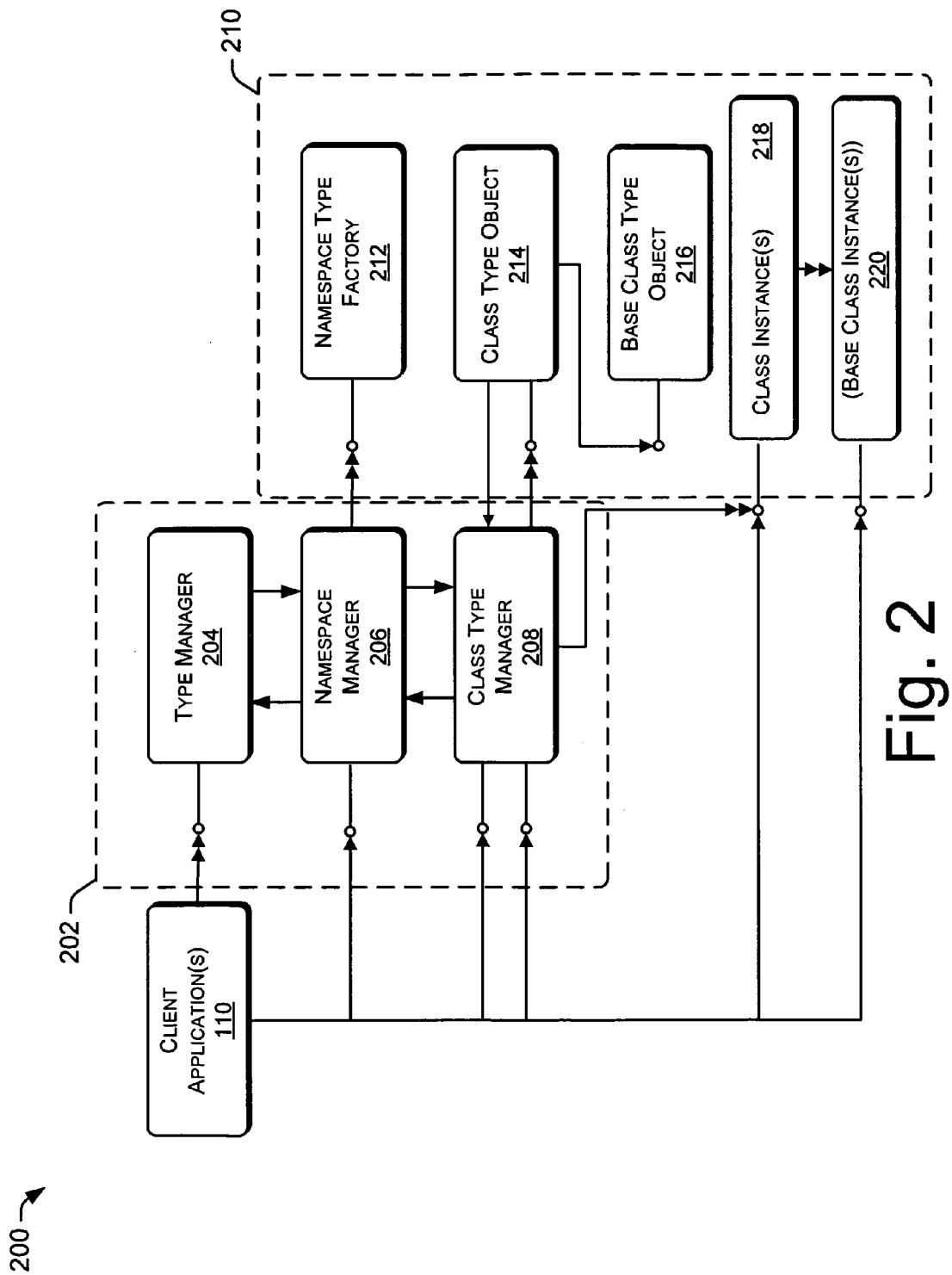
FIG. 2 illustrates one example of an object-oriented architecture that can implement techniques and processes for user interface creation discussed herein, in accordance with one or more embodiments.

FIG. 2 illustrates at 200 one example of an object-oriented architecture that may implement the techniques and processes for UI creation discussed herein. The architecture may be implemented in connection with any suitable hardware, software, firmware, or combination thereof. As part of the architecture are one or more client applications 110, examples of which are given above. Illustrated at 202 are some of the core objects of the UIOM framework. These core objects include a Type Manager 204, a Namespace Manager 206, and a Class Type Manager 208. Illustrated at 210 are some UI customization objects that can be created and/or otherwise utilized by the UIOM framework to create a UI. These UI customization objects include, in this example, a Namespace Type Factory 212, a Class Type Object 214, a Base Class Type Object 216, one or more Class Instances 218, and one or more Base Class Instances 220.

Each of the objects in architecture 200 includes one or more interfaces that can expose functions and/or methods that can be accessed by applications, objects, and/or processes to implement the techniques for UI creation discussed herein. In this particular example, the double-headed arrows indicate that a particular object is created and/or owned by another object, application, and/or process. For example, Type Manager object 204 may be created by client application 110. The single-headed arrows indicate that one object is holding a reference to another object. Implementation examples of architecture 200 and its interfaces and methods are discussed below.

In example architecture 200, the Type Manager object is a top-level interface to the UIOM framework. The Type Manager manages loading and creation of classes of objects for one or more namespaces. In some embodiments, a namespace represents one or more sets of related classes of UI elements that are defined by the same party (e.g., a software developer). One or more of the namespaces are represented by the Namespace Manager object 206, which handles communication with one or more Namespace Type Factory objects 212 provided by an entity that creates custom types (e.g., custom UI objects). A custom type is represented by the Class Type object 214, which specifies a base class type, and provides a factory for creating instances of the class. In some embodiments, the Class Type object provides functionality to query for class-specific interfaces to set properties, subscribe to events, and access other functionality that may be exposed by an interface.

Example Processes

Figure 3:
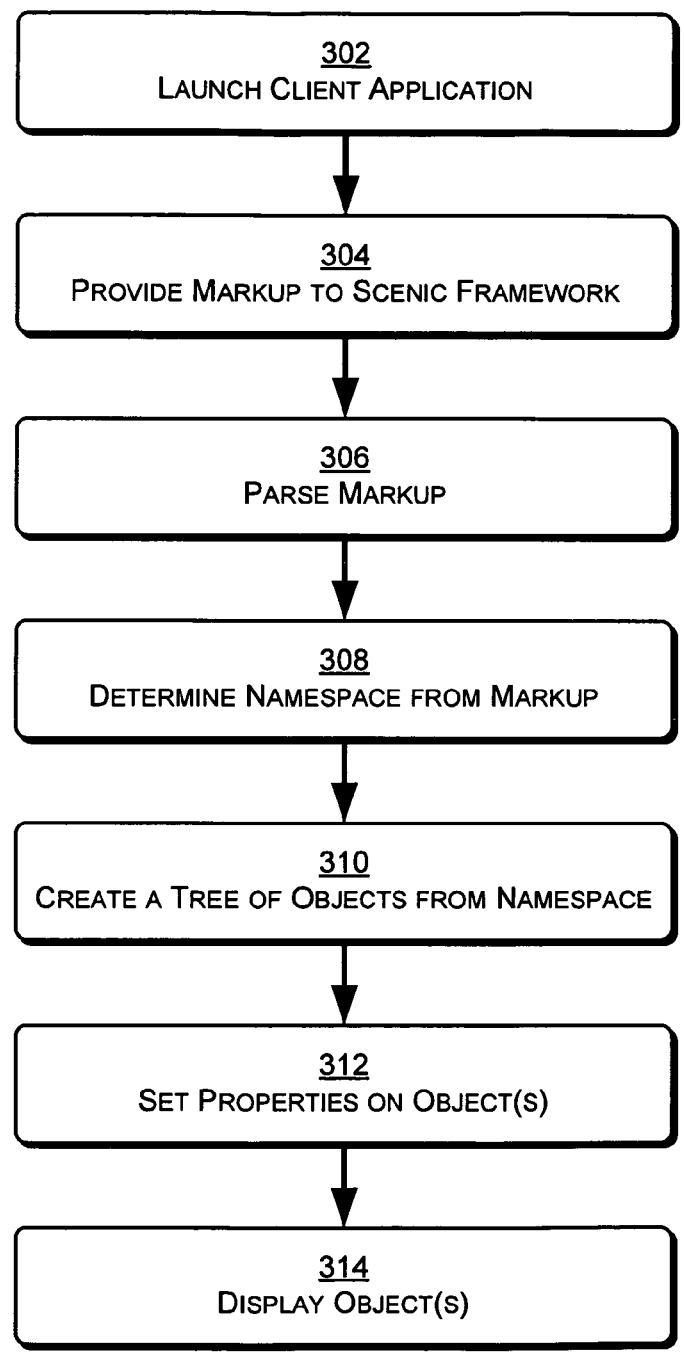
FIG. 3 is a flow diagram of one example process for generating user interface elements utilizing techniques discussed herein, according to one or more embodiments.
Figure 4:
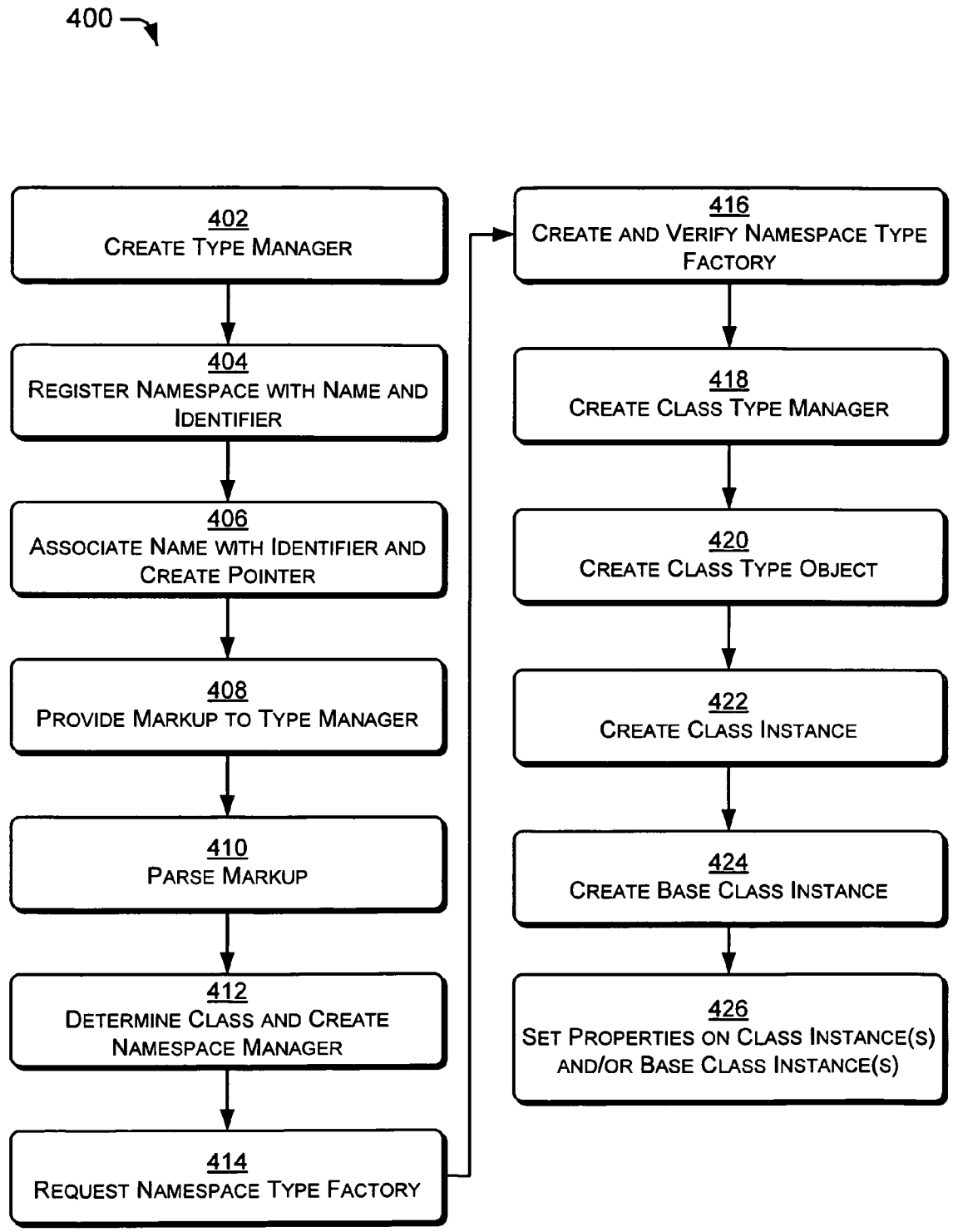
FIG. 4 is a flow diagram of one example process for generating user interface elements utilizing the object-oriented architecture discussed herein, according to one or more embodiments.

FIGS. 3 and 4 illustrate examples of processes and operating scenarios that implement aspects of the principles and techniques discussed herein, according to one or more embodiments. These processes and/or scenarios are discussed in reference to architecture 200. This is not intended to be limiting, however, and the processes and/or scenarios may be implemented by any suitable architecture and/or UI framework. These processes can be implemented in connection with any suitable hardware, software, firmware, or combination thereof.

FIG. 3 illustrates at 300 a flow diagram that represents one process that utilizes the UIOM framework to generate a UI. At 302, a client application is launched. At 304, the client application provides markup to the UIOM framework. In some embodiments, the markup specifies one or more aspects of a UI (e.g., a textbox, a radio button, a banner, and so on). At 306, the markup is parsed to extract one or more UI specifications from the markup. The UIOM framework may include a markup parser and/or the UIOM framework may provide the markup to an external parser, which then returns the parsed markup to the framework for further processing.

At 308, the UIOM framework determines a namespace and a class name from the parsed markup. In one example, the UIOM framework receives the markup "acme:textbox", from which it determines that the namespace is "acme" and the class name is "textbox". At 310, the UIOM framework creates a tree of objects that includes one or more class types and class instances that correspond to the namespace and the class name. In the current example, the class instances include a textbox instance of the textbox class. At 312, one or more properties are set on the objects of the object tree, which may include the class instance(s). Continuing the current example, the size and color of the textbox are specified. At 314, one or more of the class instances are displayed. In the current example, this can include displaying the text box in a UI.

FIG. 4 illustrates a process 400 for utilizing one or more aspects of the UIOM architecture to generate a UI. Some aspects of process 400 explain in more detail certain implementation specifics of process 300, discussed above. Also, for purposes of example only, process 400 is discussed in reference to architecture 200.

At 402, a client application creates a type manager. In one example, the client application calls a CoCreateInstanceo API that creates an instance of the type manager. At 404, to register a namespace with the type manager, the client application calls a method on the type manager (e.g., the RegisterNamespace method discussed below in the "Interfaces" section) and provides a string name of the namespace and an identifier (e.g., a class identifier) for a namespace type factory for the namespace. At 406, the type manager associates the string name with the identifier and a pointer to a namespace manager. Initially, the pointer value is set to null. At 408, the client application provides markup to the type manager and requests that the type manager parse the markup and create a tree of objects from the markup. At 410, the type manager parses the markup and determines one or more namespaces from the markup. The type manager may implement its own markup parser, or it may send the markup to an external parser to be processed. At 412, a class in the namespace is determined from the markup and, in response, a method is called that creates a namespace manager. In one or more embodiments, the namespace manager is not created until a class in the namespace is encountered and/or the client application calls an API to access a class in the namespace. This "on demand" aspect provides a more efficient and economical way of generating a UI and UI elements.

The type manager calls a method on the namespace manager that requests that a namespace type factory be created for the namespace (block 414). According to some embodiments, the type manager provides a globally unique identifier (GUID) to the namespace manager and requests that the namespace manager create a namespace type factory that is associated with the GUID. For example, a developer may create a namespace type factory and register the namespace type factory using the GUID. The namespace manager handles communication with the namespace type factory.

At 416, the namespace type factory is created and the namespace manager calls a method on the namespace type factory that asks the namespace type factory for its identifier (e.g., its namespace, its GUID, and so on). If the namespace type factory returns the identifier that the namespace manager used to request the creation of the factory, this verifies that the correct namespace type factory has been created. At 418, the client application calls a method that creates a class type manager. The class type manager provides one or more interfaces to class type objects that are to be created. At 420, the client application calls a method that creates a class type object. Using the example discussed above in FIG. 3, the client application calls a method on the namespace type factory that creates a class type object with the class name "textbox".

To create an instance of the class, at 422 a method is called that creates a class instance. Using the example from FIG. 3, the class instance would comprise a textbox object. As one example of the creation of a textbox object, the class type manager includes an IUIClassFactory interface that provides a method for creating an instance of a class. This interface is accessible to one or more of the objects in the UI architecture, as well as the client application. The object(s) and/or the client application may call the method to initiate the creation of the class instance. At 424, one or more base class instances for the class instance are created. In one or more embodiments, the base class instances include functionality and/or properties that the class instance inherits from the base classes. A base class instance may include one or more interfaces for registering properties for the base class. The class instance may also override and/or extend properties and functionality of one or more of its base classes. At 426, properties are set on the class instance and/or its base class instance(s). Properties may include visual aspects (e.g., size, color, and so on) as well as behavior and functionality.

This example process is effective to create a tree of objects that are used to define one or more aspects of a UI. For purposes of simplicity, this example process discusses the creation of a tree that includes a single instance of a single class and one or more base classes (i.e., the text box instance of the text box class). However, in many implementation scenarios, a tree of objects will be created with multiple different class types, class instances, and base classes.

Implementation Specifics

The following sections discuss particular UIOM implementation specifics, according to one or more embodiments.

Implementation Inheritance

In some embodiments, the UIOM framework utilizes a DependencyObject base class, from which one or more class types may inherit properties and/or functionality. The DependencyObject type exposes interfaces for accessing properties and for subscribing to and raising UIOM events. For generating a UI, a hierarchy of objects that define different aspects of the UI may descend from the DependencyObject type.

In some embodiments, the UIOM framework utilizes COM-based aggregation techniques such as blind aggregation. The following pseudo-code illustrates one example of a ToggleButton class that inherits properties and/or functionality from a Button class using COM-based aggregation:

```
class ToggleButton :
    public CComObjectRootEx<CComObjectThreadModel>,
    public IUIToggleButton
{
    CComPtr<IUINamespaceTypeFactory> m_spCoreFactory;
    ToggleButton(IUINamespaceTypeFactory pCoreFactory)
    {
        // Store a ref to the factory for types from the core namespace.
        m_spCoreFactory = pCoreFactory;
    }
    CComPtr<IUIButtonBase> m_spButtonBase;
    HRESULT FinalConstruct( )
    {
        // COM blind-aggregation to reuse the Button base class implementation.
        m_spButtonBase = m_spCoreFactory->CreateInstance("Button", GetUnknown( ));
    }
    BEGIN_COM_MAP( )
        COM_INTERFACE_ENTRY(IUIToggleButton)
        COM_INTERFACE_ENTRY_AGGREGATE_BLIND(m_spButtonBase)
    END_COM_MAP( )
        // Add only IUIToggleButton functionality
        BOOL m_fToggled;
        STDMETHOD IsToggled(BOOL* pValue)
        {
            return m_fToggled;
        }
        STDMETHOD Toggle( )
        {
            m_fToggled = !m_fToggled;
        }
}
```

In some embodiments, IUINamespaceTypeFactory is used for creating ClassTypes and ClassFactories are used for creating instances. The following is some sample UIElement Code that blind aggregates a TreeElement, which it creates by calling pClassFactoryTreeElement→CreateBaseInstance.

```
class ATL_NO_VTABLE CUIElement :
    public CComObjectRootEx<CComSingleThreadModel>,
    public CUIElementBase
{
public:
    DECLARE_NO_REGISTRY( )
    DECLARE_GET_CONTROLLING_UNKNOWN( )
    BEGIN_COM_MAP(CUIElement)
        COM_INTERFACE_ENTRY(IUIElement)
COM_INTERFACE_ENTRY_AGGREGATE_BLIND(_pUnkTreeElement)
    END_COM_MAP( )
    DECLARE_PROTECT_FINAL_CONSTRUCT( )
    HRESULT FinalConstruct( )
    {
        _pUnkTreeElement = NULL;
        return S_OK;
    }
    CHKMETHOD InitializeBaseClass(IUIClassFactory *pClassFactoryTreeElement)
    {
        RETURN_IF_FAILED(pClassFactoryTreeElement->CreateBaseInstance(GetControllingUnknown( ), &_pUnkTreeElement));
        return S_OK;
    }
    void FinalRelease( )
    {
        if (_pUnkTreeElement)
        {
```

-continued

```
        _pUnkTreeElement->Release( );
    }
  }
};
```

Creating a New Type and Overriding a Base Class ImplementationIn some embodiments, COM-based containment may be used to override a base class implementation. The following pseudo-code illustrates a new class WrapPanel that inherits from a Panel base class. In this example, the WrapPanel class overrides the IUILayout interface implementation utilized by the Panel base class. As illustrated below, new logic is provided by the new WrapPanel class for Measure and Arrange functions (indicated in bold below) of the Panel base class. Other interfaces implemented by the Panel base class may be blind aggregated by the WrapPanel class.

```
class WrapPanel :
    public CComObjectRootEx<CComObjectThreadModel>,
    public IUILayout
{
    CComPtr<IUINamespaceTypeFactory> m_spCoreFactory;
    WrapPanel(IUINamespaceTypeFactory pCoreFactory)
    {
        // Store a ref to the factory for types from the core namespace.
        m_spCoreFactory = pCoreFactory;
    }
    CComPtr<IUILayout> m_spPanelBase;
    HRESULT FinalConstruct( )
    {
        // COM blind-aggregation to reuse the Panel base class
implementation.
        m_spPanelBase = m_spCoreFactory->CreateInstance("Panel",
GetUnknown( ));
    }
    BEGIN_COM_MAP( )
        COM_INTERFACE_ENTRY(IUILayout) // override IUILayout
interface
        COM_INTERFACE_ENTRY_AGGREGATE_BLIND
        (m_spPanelBase
    )
    END_COM_MAP( )
    // Override IUILayout methods
    STDMETHOD Measure(SIZE available, SIZE* pDesiredSize)
    {
        // Re-use base class implementation to measure children.
        return m_spPanelBase->Measure(available, pDesiredSize);
    }
    STDMETHOD Arrange(SIZE available)
    {
        // Perform custom logic to arrange children in the space available.
        ...
        ...
        ...
    }
}
```

Element Trees

In some embodiments, UIOM elements are COM objects, but are not necessarily created using the CoCreateInstance( ) API. One or more DLLs may be utilized to provide UIOM functionality, and the DLLs may provide one or more "element factories", such as the namespace type factory, which are logically mapped to a markup namespace and include functionality to create instances of UIOM elements (e.g., a class instance) using an element name string (e.g., "acme:textbox" from the example given above). Utilizing these techniques, a tree of UI elements may be created starting with an outer object (e.g., a UI window frame) and creating internals for the outer object (e.g., a button and a textbox for the UI window frame). The element factories may also provide class type information and one or more interfaces for setting object dependency properties and subscribing to events. Pseudo-code for creating an UIOM element utilizing an element factory is provided below:

```
// Init UserInterface framework factory for built-in types.
  CComPtr<IUIUserInterfaceTypeFactory> spSCF =
::CoCreateInstance(CLSID_UserInterfaceCoreFactory);
  CComPtr<IUIButton> spButton = spSCF->CreateInstance("Button");
```

In some embodiments, the UIOM framework utilizes a DependencyObject base class as the ultimate base class for UIOM objects. An IUIDependencyObject interface includes methods for obtaining and setting properties on UIOM objects. The pseudo-code illustrated below presents one implementation of the IUIDependencyObject as an implementation of IUITreeElement and/or IUITreeContainer interfaces, which define methods for object tree traversal, including references to one or more child nodes in an object tree and/or one or more pointers to a parent node.

```
// Init UserInterface framework factory for built-in types.
  CComPtr<IUIUserInterfaceTypeFactory> spSCF =
::CoCreateInstance(CLSID_UserInterfaceCoreFactory);
  // Create outer window, a layout panel, and a trio of controls.
  CComPtr<IUITreeElement> spOverlappedWindow = spSCF-
>CreateInstance("OverlappedWindow");
  CComPtr<IUITreeContainer> spWrapPanel = spSCF-
>CreateInstance("WrapPanel");
  CComPtr<IUITreeElement> spButton = spSCF-
>CreateInstance("Button");
  CComPtr<IUITreeElement> spTextBox = spSCF-
>CreateInstance("TextBox");
  CComPtr<IUITreeElement> spLabel = spSCF-
>CreateInstance("Label");
  // Wire up the tree.
  CComPtr<IUIElementList> spChildren = spWrapPanel-
>GetChildren( );
  spChildren->Add(spButton);
  spChildren->Add(spTextBox);
  spChildren->Add(spLabel);
  spOverlappedWindow->SetContent(spWrapPanel);
```

Properties

In some embodiments, retrieving and setting object properties uses a pair of Get/Set methods associated with one or more object interfaces. This is illustrated in the following pseudo-code:

```
spButton->SetWidth(34.5);
spButton->SetHeight(67.8);
```

Underlying storage for property values can be implemented in a property system. In some embodiments, a property system stores property values for a variety of UI elements. When a value for a property is requested for a UI element (e.g., a width value for a text box), the value can be retrieved from the property system. For example, the DependecyObject may store property values for one or more object UI element properties. Further to the ToggleButton example discussed above, the property accessors may be strongly-typed wrappers for DependencyObject properties. This is illustrated below is pseudo-code:

```
// Add IUIToggleButton functionality
STDMETHOD IsToggled(BOOL* pValue)
{
    CComQIPtr<IUIDependencyObject> spThisDO = GetUnknown( );
    spThisDO->GetBoolValue("IsToggled", pValue);
}
STDMETHOD Toggle( )
{
    CComQIPtr<IUIDependencyObject> spThisDO = GetUnknown( );
    BOOL currentValue;
    spThisDO->GetBoolValue("IsToggled", ¤tValue);
    spThisDO->SetBoolValue("IsToggled", !(currentValue));
}
```

In some embodiments, properties are set according to their string name and with a string value. This may be accomplished by accessing the UIOM element's IUIDependencyObject interface, as illustrated in the following pseudo-code:

```
CComQIPtr<IUIDependencyObject> spElementDO = spElement;
spElementDO->SetStringValue("IsToggled", "True");
```

Property Inheritance

Properties may be set on one or more elements in a tree of objects, even if an element is of an unrelated type. Thus, in some embodiments, property values can be considered to be inherited by one or more descendent tree elements. In some embodiments, an ancestor element on a tree (e.g., a parent node) does not know the set of properties for a child element. In these embodiments, a child element's properties are set on the node's namespace type factory object. The following example of pseudo-code sets the TextBox::FontSize property on an ancestor element higher up in a tree of elements:

```
// Set the TextBlock::FontSize property on this panel, to be inherited by
all child elements:
//   <Panel TextBlock.FontSize="24">
CComQIPtr<IUITextBlockProperties> spTextBlockProperties = spSCF-
>GetTypeInfo("TextBlock");
spTextBlockProperties->SetFontSize(spPanelElement, 24);
```

Properties may also be set on a descendant element based on one or more of its ancestor elements. These are known as attached properties. Properties may be set on the descendent element's namespace type factory object. The following pseudo-code sets a Panel::ZIndex property on a child element:

```
// Set the Panel::ZIndex attached property, on the child element:
//   <Child Panel.ZIndex="1">
CComQIPtr<IUIPanelAttachedProperties> spPanelProperties = spSCF-
>GetTypeInfo("Panel");
spPanelProperties->SetZIndex(spChildElement, 1);
```

Client applications may use CoCreateInstanceo to obtain a factory for one or more core UIOM classes, and may also use CoCreateInstanceo to obtain a factory for a third party component that is developed outside of the core UIOM architecture. One example of a client application startup utilizing the core UIOM architecture and one or more third party components is illustrated in the following pseudo-code. The following pseudo-code:

(1) creates an instance of a type manager;
(2) registers one or more namespaces;
(3) instantiates IUINamespaceTypeFactory (if this has not already been done). In some embodiments, this is implemented before a class type is used in a namespace;
(4) retrieves a class factory for instantiating one or more classes; and
(5) saves the class factory for creating future instances of the class.

```
CComPtr<IUITypeManager> spTypeManager;
    ::CoCreateInstance(CLSID_UITypeManager, NULL,
CLSCTX_INPROC_SERVER, _uuidof(IUITypeManager), (void
**)&spTypeManager);
    spTypeManager->RegisterNamespace(L"ThirdPartyNamespace",
CLSID_ThirdPartyNamespace);
    CComPtr<IUINamespaceManager> spThirdPartyNamespace;
    spTypeManager->GetNamespaceManager(L"ThirdPartyNamespace",
&spThirdPartyNamespace);
    CComPtr<IUIClassFactory> spClassFactoryCoolButton;
    spThirdPartyNamespace->GetClassFactory(L"CoolButton", &
spClassFactoryCoolButton);
    CComPtr<ICoolButton> spCoolButton;
    spClassFactoryCoolButton->CreateInstance(&spCoolButton);
```

Interfaces

This section presents several interfaces that may be implemented to generate a UI using the UIOM architecture. The interfaces are explained in Interface Design Language (IDL), and include an explanation of the functionality of each interface.

Interface: IUITypeManager: IUnknown

```
{
    // Clients call RegisterNamespace before attempting to call
GetNamespaceManager or parse XAML that refers to the given namespace
    // The name passed in should match that returned by
IUINamespaceTypeFactory::GetNamespaceName, or calls to
GetNamespaceManager may fail
    HRESULT
    RegisterNamespace
    (
        [in] PCWSTR namespaceName,              // Globally
unique namespace name
        [in] REFCLSID rclsidNamespaceTypeFactory    // ID of
CoCreatable class that implements IUINamespaceTypeFactory
    );
    // Get an IUINamespaceManager for the given namespace
    // If necessary, the appropriate registered class is CoCreated behind the
scenes
    HRESULT
    GetNamespaceManager
    (
        [in] PCWSTR namespaceName,              // Globally
unique namespace name, same as passed to RegisterNamespace
        [out, retval] IUINamespaceManager **namespaceManager
    );
    // Release all namespaces to all allow IUINamespaceTypeFactory
implementions to be destroyed
    // It is possible to subsequently call GetNamespaceManager and
create new instances
    HRESULT
    RevokeNamespaces
    (
    );
};
[
    object, local, pointer_default(unique),
    uuid(5B3614A0-795E-4c23-8017-C18E2088727B),
    helpstring("IUINamespaceManager Interface")
]
```

```
// Interface to a system-created object managing access to classes in a
namespace
// Internally communicates with IUINamespaceTypeFactory class
registered for namespace
``` interface IUINamespaceManager: IUnknown

```
{
    // Get the class type object for a given class within a namespace
    // This may cause the class type to be initialized and registered for the
first time
    HRESULT
    GetClassType
    (
        [in] PCWSTR className,      // Class name,
unique within the namespace
        [out, retval] IUIClassType **classType
    );
    // Get a class factory for a given class within a namespace
    // This may cause the class type to be initialized and registered for the
first time
    HRESULT
    GetClassFactory
    (
        [in] PCWSTR className,      // Class name,
unique within the namespace
        [out, retval] IUIClassFactory **classFactory
    );
};
[
    object, local, pointer_default(unique),
    uuid(6CACFBFA-E51A-4d51-B133-3695725E4486),
    helpstring("IUINamespaceTypeFactory Interface")
]
// Interface to a client-created object for mapping class names to Class
Type objects
``` interface IUINamespaceTypeFactory: IUnknown

```
{
    // Get the namespace name
    // This should match the name passed to
IUITypeManager::RegisterNamespace or calls to
IUITypeManager::GetNamespace may fail.
    HRESULT
    GetNamespaceName
    (
        [out, retval, annotation("__deref_out")] PWSTR
        *namespaceName     //
The namespace name - the client should CoTaskMemFree this string when
finished with it
    );
    // Create a class type object for the given class
    // This may only be called once per class
    HRESULT
    CreateClassType
    (
        [in] PCWSTR className,        // Class name,
unique within the namespace
        [out, retval] IUIClassType **classType
    );
};
[
    object, local, pointer_default(unique),
    uuid(318929FF-80FF-47bf-B7C3-8F78A7A76628),
    helpstring("IUIClassType Interface")
]
// Interface to a client-created object representing the type of a class
``` interface IUIClassType: IUnknown

```
{
    // Initialize the class and register its properties and events
    // This may only be called once per namespace
    // All calls to the IUIClassDeclaration passed in should be made before
this method returns
    HRESULT
    Initialize
    (
        [in] IUITypeManager *typeManager,           // The one
TypeManager, which can be used for obtaining the base class
        [in] IUIClassDeclaration *classDeclaration       //
IUIClassDeclaration to be used for registering properties and events
    );
    // Get the base class type
    // This may be called multiple times and should always return the same
answer
    // Every class may have a base class, with the sole exception of
DependencyObject
    HRESULT
    GetBaseClassType
    (
        [out, retval] IUIClassType **baseClassType
    );
};
cpp_quote("#ifndef USE_HELPER_TEMPLATES")
[
    object, local, pointer_default(unique),
    uuid(A1E9854E-16B9-4857-BD70-F8813A3B5FEE),
    helpstring("IUIClassFactory Interface")
]
// Interface to a client-created class factory object
``` interface IUIClassFactory: IUnknown

```
{
    // Create an instance of the class and return the requested interface
    HRESULT
    CreateInstance
    (
        [in] REFIID riid,                // Requested Interface ID
        [out, retval, iid_is(riid)] IUnknown **object
    );
    // Create an instance of the class to serve as the base class of an instance
of another class
    HRESULT
    CreateBaseInstance
    (
        [in] IUnknown *outerObject,        // The instance
of the derived class
        [out, retval] IUnknown **object
    );
};
// The currently supported types of properties
typedef enum
{
    UI_PROPERTY_TYPE_DATA,           // An
arbitrary block of bytes, containing no pointers - each data property has
its own fixed size
    UI_PROPERTY_TYPE_STRING,         // A null-
terminated Unicode (UTF-16) string
    UI_PROPERTY_TYPE_OBJECT,         // An
IUnknown*, which may be AddRef'ed and Released appropriately
    UI_PROPERTY_TYPE_CHILD,          // A child
IUITreeElement*
    UI_PROPERTY_TYPE_CHILDLIST       // A list of
IUITreeElement* children
} UI_PROPERTY_TYPE;
// Event routing strategies
typedef enum
{
    UI_ROUTING_STRATEGY_TUNNEL,
    UI_ROUTING_STRATEGY_BUBBLE,
    UI_ROUTING_STRATEGY_TUNNEL_THEN_BUBBLE
} UI_ROUTING_STRATEGY;
[v1_enum]
typedef enum
```

```
{
    UI_PROPERTY_DEPENDENCY_NONE    = 0x00000000,
    UI_PROPERTY_DEPENDENCY_MEASURE = 0x00000001,
    UI_PROPERTY_DEPENDENCY_ARRANGE = 0x00000002,
    UI_PROPERTY_DEPENDENCY_RENDER  = 0x00000004
} UI_PROPERTY_DEPENDENCIES;
cpp_quote("DEFINE_ENUM_FLAG_OPERATORS-
(UI_PROPERTY_DEPENDENCIES
);")
```

```
[
    object, local, pointer_default(unique),
    uuid(C8090FD7-1D36-4db0-8B80-3D791F1AC0E4),
    helpstring("IUIClassDeclaration Interface")
]
// Interface to a system-created object passed to IUIClassType::Initialize,
to be used for registering properties and events supported by a class
``` interface IUIClassDeclaration: IUnknown

```
{
    // DependencyObject concepts
    // Register a data property that may be managed by the base
DependencyObject
    HRESULT
    RegisterDataProperty
    (
        [in] PCWSTR propertyName,                       // Property name,
unique for the class
        [in] UINT32 size,                               // The size of the
property, in bytes - should be > 0
        [out, retval] IUIProperty **property
    );
    // Register a property that may be managed by the base DependencyObject
    HRESULT
    RegisterProperty
    (
        [in] PCWSTR propertyName,                       // Property name,
unique for the class
        [in] UI_PROPERTY_TYPE type,                     // The type of
the property, may not be UI_PROPERTY_TYPE_DATA
        [out, retval] IUIProperty **property
    );
    // Register a property that may be managed by instances of the class directly
(which may or may not in turn call the base DependencyObject)
    HRESULT
    RegisterCustomProperty
    (
        [in] PCWSTR propertyName,                       // Property name,
unique for the class
        [in] UI_PROPERTY_TYPE type,                     // The type of
the property
        [in] UINT32 vtableOffsetSet,                    // Vtable offset of
set method with appropriate signature for the given type
        [out, retval] IUIProperty **property
    );
    // Set the handler to be called when the value of any property changes on
instances of the class
    HRESULT
    SetGenericPropertyChangeHandler
    (
        [in] IUIGenericPropertyChangeHandler *handler   // Handler
to be called
    );
    // Set the handler to be called when the value of the given property changes
on instances of the class
    HRESULT
    SetPropertyChangeHandler
    (
        [in] IUIProperty *property,                     // Property that, when
changed, may cause handler to be called
        [in] IUIPropertyChangeHandler *handler          // Handler to
be called
    );
    // Set the aspects of layout and rendering that depend on a given property
    HRESULT
    SetPropertyDependencies
    (
        [in] IUIProperty *property,                     // The property for
which the dependencies are being set
        [in] UI_PROPERTY_DEPENDENCIES dependencies      //
The layout and rendering dependencies on the property
    );
    // Set the default value of a data property on instances of the class
    HRESULT
    SetPropertyDefault
```

```
      (
          [in] IUIProperty *property,                     // The property,
which should have been registered with type UI_PROPERTY_TYPE_DATA
          [in] UINT32 size,                               // Size of the value, in
bytes; this should match the size registered for the property
          [in, size_is(size)] const void *value           // Default value of
the property
      );
      // Set the default value of a string property on instances of the class
      HRESULT
      SetStringPropertyDefault
      (
``` interface IUIDependencyObject: IUnknown

```
{
      // Method to be called by derived objects at construction time, so a
DependencyObject knows the type of the object it is being re-used by
      HRESULT
      SetClassType
      (
          [in] IUIClassType *classType                    // The class of the
outermost (most-derived) object aggregating this DependencyObject
      );
      // Get the class type of the outermost (most-derived) object aggregating this
DependencyObject
      HRESULT
      GetClassType
      (
          [out, retval] IUIClassType **classType          // The class of
the outermost (most-derived) object aggregating this DependencyObject
      );
      // Set the value of a data property
      HRESULT
      SetValue
      (
          [in] IUIProperty *property,                     // The property to set,
which should have been registered with type UI_PROPERTY_TYPE_DATA
          [in] UINT32 size,                               // Size of the value, in
bytes; this should match the size registered for the property
          [in, size_is(size)] const void *value           // New value of the
property
      );
      // Set the value of a string property
      HRESULT
      SetStringValue
      (
          [in] IUIProperty *property,                     // The property to set,
which should have been registered with type UI_PROPERTY_TYPE_STRING
          [in] PCWSTR value                               // New value of the
property - the system may make its own copy of the string
      );
      // Set the value of an object property
      HRESULT
      SetObjectValue
      (
          [in] IUIProperty *property,                     // The property to set,
which should have been registered with type UI_PROPERTY_TYPE_OBJECT
          [in] IUnknown *value                            // New value of the
property - the system may AddRef the object for as long as it is stored
      );
      // Get the value of a data property
      HRESULT
      GetValue
      (
          [in] IUIProperty *propety,                      // The property to get,
which should have been registered with type UI_PROPERTY_TYPE_DATA
          [in] UINT32 size,                               // Size of the value, in
bytes; this should match the size registered for the property
          [out, retval, size_is(size)] void *value        // The current
value of the property
      );
      // Get the value of a string property
      HRESULT
      GetStringValue
```

```
                                          -continued (
         [in] IUIProperty *property,                      // The property to get,
which should have been registered with type UI_PROPERTY_TYPE_STRING
         [out, retval, annotation("__deref_out")] PWSTR *value      // The
current value of the property - the client should CoTaskMemFree this string
when finished with it
      );
      // Get the value of an object property
      HRESULT
      GetObjectValue
      (
         [in] IUIProperty *property,                      // The property to get,
which should have been registered with type UI_PROPERTY_TYPE_OBJECT
         [out, retval] IUnknown **value                   // The current
value of the property - the client should Release this pointer when finished with
it
      );
      // Get the aspects of layout and rendering that depend on a given property
      HRESULT
      GetPropertyDependencies
      (
         [in] IUIProperty *property,                      // The property to get
the dependencies of
         [out, retval] UI_PROPERTY_DEPENDENCIES *dependencies
// The layout and rendering dependencies on the property
      );
      // Add a handler for a given event
      // Any number of handlers may be added for a given event on a given
DependencyObject
      HRESULT
      AddHandler
      (
         [in] IUIEvent *event,                            // The event to handle
         [in] IUIEventHandler *eventHandler               // The handler to
be called when the event is raised
      );
      // Raise an event on this DependencyObject
      // All of the registered handlers for the given event on this
DependencyObject may be called
      HRESULT
      RaiseEvent
      (
         [in] IUIEvent *event,                            // The event to be
raised
         [in, unique] IUnknown *eventArgs                 // The arguments
to be passed to each event handler - this should be an interface with the ID
registered for the event
      );
   };
   [
      object, local, pointer_default(unique),
      uuid(A4EFBC06-40A3-4f39-B26E-4E82FB264E8E),
      helpstring("IUITreeElementType Interface")
   ]
// Interface to the IUITreeElement Type, the base class of all UI classes which
participate in the Tree
```

These interfaces are part of a UIOM API that controls the loading, registration, instantiation, and initialization of UIOM classes which, in some embodiments, inherit properties and/or functionality from the DependencyObject base class.

Various techniques may be described herein in the general context of software or program modules. Generally, software includes routines, computer-executable instructions, programs, objects, components, data structures, and so forth that perform particular tasks or implement particular abstract data types. An implementation of these modules and techniques may be stored on or transmitted across some form of computer-readable media. Computer-readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

The above-described principles and techniques provide for user interface creation using markup language and object-oriented programming techniques. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processors;
   one or more computer-readable storage devices;
   computer-executable instructions stored on the computer-readable storage devices and executable by the one or more processors to implement an application programming interface (API) to perform a method comprising:
   registering a namespace associated with one or more elements of a user interface, the namespace comprising a set of class types that define one or more elements of the user interface;
   providing markup to a parser configured to return parsed markup based on the markup provided;
   receiving the parsed markup from the parser, the parsed markup useful to determine one or more user interface specifications;
   determining, based on the parsed markup, a user interface object model (UIOM) class of objects within the namespace;
   generating, in response to parsing markup to determine the UIOM class of objects, one or more instances of the UIOM class of objects each having a first property inherited from a base class and a second property overridden from the base class;
   setting one or more other properties of the one or more instances of the UIOM class, the other properties comprising visual attributes of the instances; and
   creating a tree of objects that comprises the one or more instances and the base class, the tree of objects defining at least part of the user interface.

2. The system as recited in claim 1, wherein determining the UIOM class of objects within the namespace determines a class name from the parsed markup, the class name usable to determine the UIOM class of objects.

3. The system as recited in claim 1, wherein the UIOM class of objects includes a button, a textbox, or a banner.

4. The system as recited in claim 1, wherein the UIOM class of objects includes an external user interface object.

5. The system as recited in claim 4, wherein the UIOM class of objects includes an internal user interface object related to the external user interface object.

6. The system as recited in claim 1, wherein the one or more instances of the UIOM class of objects are generated using a dynamic link library.

7. The system as recited in claim 1, wherein the API is part of a UIOM framework configured to generate the user interface based on the markup, and the providing and the receiving are performed within the API or the UIOM framework.

8. The system as recited in claim 1, wherein at least one of the one or more instances of the UIOM class of objects has a functionality inherited from the base class.

9. The system as recited in claim 1, wherein at least one of the one or more instances of the UIOM class of objects has a functionality overridden from the base class.

10. The system as recited in claim 1, wherein one or more instances are descendant elements and setting the one or more other properties of the one or more instances is based on one or more ancestral elements.

11. A method implemented via an application programming interface (API), the method comprising:
    registering a namespace associated with one or more elements of a user interface, the namespace comprising a set of class types that define one or more elements of the user interface;
    providing markup to a parser configured to return parsed markup based on the markup provided;
    receiving the parsed markup from the parser, the parsed markup useful to determine one or more user interface specifications;
    determining, based on the parsed markup, a user interface object model (UIOM) class of objects within the namespace;
    generating, in response to parsing markup to determine the UIOM class of objects, one or more instances of the UIOM class of objects each having a first property inherited from a base class and a second property overridden from the base class;
    setting one or more other properties of the one or more instances of the UIOM class, the other properties comprising visual attributes of the instances; and
    creating a tree of objects that comprises the one or more instances and the base class, the tree of objects defining at least part of the user interface.

12. The method as recited in claim 11, wherein determining the UIOM class of objects within the namespace determines a class name from the parsed markup, the class name usable to determine the UIOM class of objects.

13. The method as recited in claim 1, wherein the UIOM class of objects includes a button, a textbox, or a banner.

14. The method as recited in claim 11, wherein the UIOM class of objects includes an external user interface object.

15. The method as recited in claim 14, wherein the UIOM class of objects includes an internal user interface object related to the external user interface object.

16. The method as recited in claim 11, wherein the one or more instances of the UIOM class of objects are generated using a dynamic link library.

17. The method as recited in claim 11, wherein one or more instances are descendant elements and setting the one or more other properties of the one or more instances is based on one or more ancestral elements.

18. The method as recited in claim 11, wherein at least one of the one or more instances of the UIOM class of objects has a functionality inherited from the base class.

19. The method as recited in claim 11, wherein at least one of the one or more instances of the UIOM class of objects has a functionality overridden from the base class.

20. The method as recited in claim 11, wherein the API is part of a UIOM framework configured to generate the user interface based on the markup.

* * * * *